US012050416B2

(12) United States Patent
Mitamura et al.

(10) Patent No.: US 12,050,416 B2
(45) Date of Patent: Jul. 30, 2024

(54) CLEANING DEVICE AND IMAGE FORMING APPARATUS

(71) Applicant: FUJIFILM Business Innovation Corp., Tokyo (JP)

(72) Inventors: Naoya Mitamura, Kanagawa (JP); Akira Shimodaira, Kanagawa (JP); Kiho Mitomo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/888,405

(22) Filed: Aug. 15, 2022

(65) Prior Publication Data

US 2023/0305445 A1 Sep. 28, 2023

(30) Foreign Application Priority Data

Mar. 25, 2022 (JP) ................................ 2022-049747

(51) Int. Cl.
*G03G 15/16* (2006.01)

(52) U.S. Cl.
CPC ....... *G03G 15/161* (2013.01); *G03G 15/1615* (2013.01); *G03G 2215/1661* (2013.01)

(58) Field of Classification Search
CPC ............. G03G 15/161; G03G 15/1615; G03G 2215/1661
See application file for complete search history.

(56) References Cited

U.S. PATENT DOCUMENTS

2007/0003337 A1* 1/2007 Shakuto ............. G03G 21/0017 399/349
2007/0264057 A1* 11/2007 Takuwa ............... G03G 15/161 399/297
2011/0052250 A1* 3/2011 Tanaka ................. G03G 15/161 399/101
2011/0129263 A1* 6/2011 Nagao ................ G03G 15/1605 399/302
2020/0401066 A1* 12/2020 Morita ................. G03G 15/161

FOREIGN PATENT DOCUMENTS

JP 2011186311 9/2011

* cited by examiner

*Primary Examiner* — Stephanie E Bloss
*Assistant Examiner* — Michael A Harrison
(74) *Attorney, Agent, or Firm* — JCIPRNET

(57) ABSTRACT

A cleaning device includes a blade-shaped cleaning member of which a tip formed by an elastic body is arranged to be pressed against an endless belt and that cleans a surface of the endless belt; and a driven roller that is arranged to face the cleaning member via the endless belt and is driven and rotated with movement of the endless belt and of which an outer peripheral surface is formed by an elastic body.

19 Claims, 5 Drawing Sheets

CLEANING DEVICE AND IMAGE FORMING APPARATUS

CROSS-REFERENCE TO RELATED APPLICATIONS

This application is based on and claims priority under 35 USC 119 from Japanese Patent Application No. 2022-049747 filed Mar. 25, 2022.

BACKGROUND

(i) Technical Field

The present invention relates to a cleaning device and an image forming apparatus.

(ii) Related Art

JP2011-186311A discloses a cleaning device that includes a blade-shaped cleaning member that is arranged to be in contact with an edge portion with a surface of an endless belt member stretched between a plurality of rollers and a facing member that supports a back surface side of the endless belt member with which the edge portion of the blade-shaped cleaning member is in contact and that is provided with an escape allowance portion allowing the endless belt member to escape from the blade-shaped cleaning member in a case where the edge portion of blade-shaped cleaning member is deformed in a direction of biting into the surface of the endless belt member.

SUMMARY

In a case where a metal roller is used as the facing roller arranged to face the blade-shaped cleaning member formed by an elastic body via the endless belt, a tip of the cleaning member is not in a target posture when the tip of the cleaning member hardens at a low temperature, and a cleaning function decreases.

Aspects of non-limiting embodiments of the present disclosure relate to a cleaning device and an image forming apparatus that suppress a deterioration in a cleaning function at a low temperature compared to a case where a roller different from a facing roller arranged to face a blade-shaped cleaning member formed by an elastic body via an endless belt is a drive roller, the case where a metal roller is used as the facing roller.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cleaning device including a blade-shaped cleaning member of which a tip formed by an elastic body is arranged to be pressed against an endless belt and that cleans a surface of the endless belt; and a driven roller that is arranged to face the cleaning member via the endless belt and is driven and rotated with movement of the endless belt and of which an outer peripheral surface is formed by an elastic body.

BRIEF DESCRIPTION OF THE DRAWINGS

Exemplary embodiment (s) of the present invention will be described in detail based on the following figures, wherein.

DETAILED DESCRIPTION

First Exemplary Embodiment

Hereinafter, an image forming apparatus according to a first exemplary embodiment will be described with reference to the drawings. An example in which the image forming apparatus includes an intermediate transfer belt will be described in the first exemplary embodiment. An arrow D shown as appropriate in each drawing indicates a circumferential direction D of an intermediate transfer belt 22, and an arrow W indicates an axial direction W of a driven roller.

Configuration of Image Forming Apparatus

Figure 1:
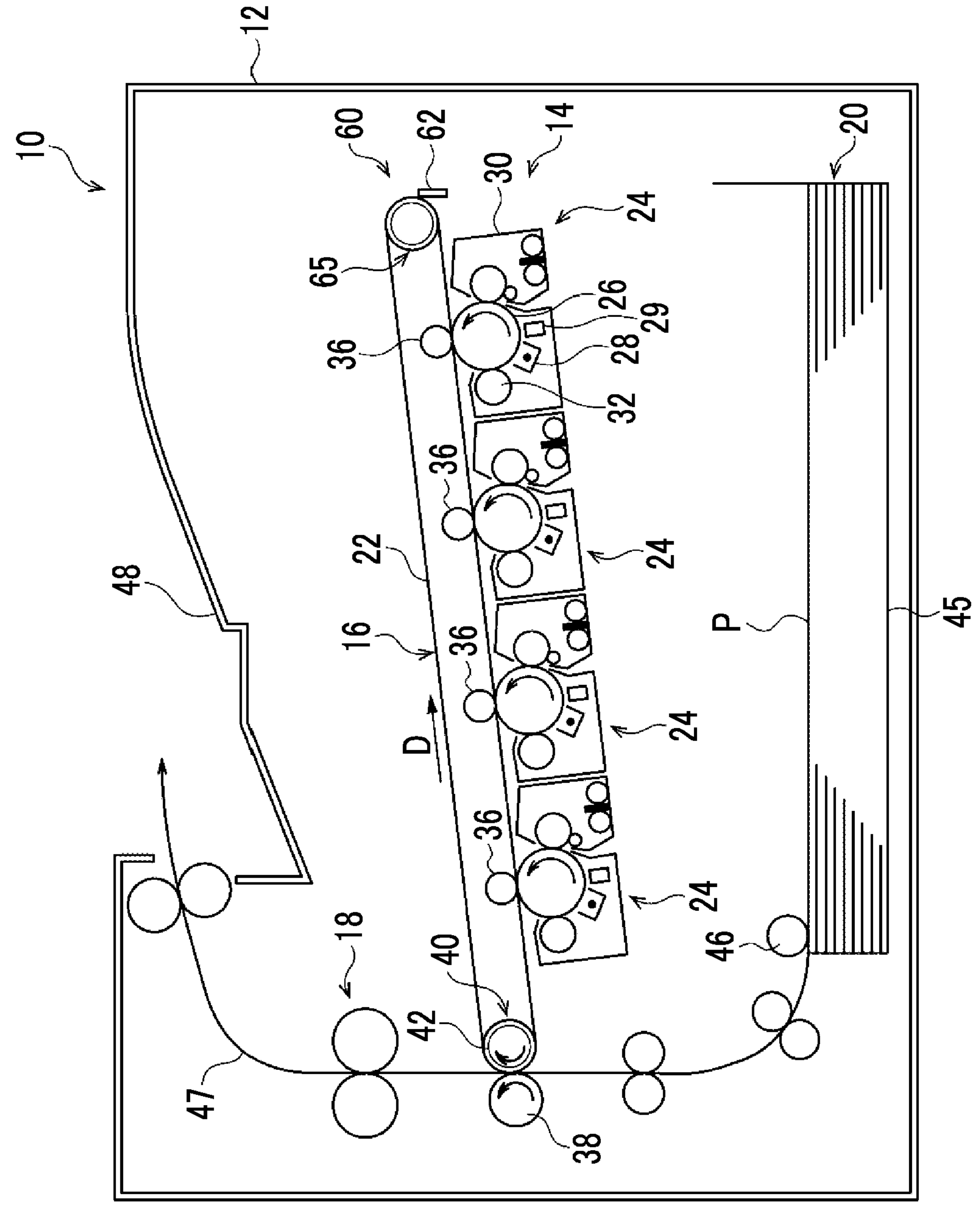
FIG. 1 is a side view showing a configuration of an image forming apparatus according to a first exemplary embodiment.

As shown in FIG. 1, an image forming apparatus 10 has a housing 12, and in the housing 12, an image forming portion 14, a transfer device 16, a fixing device 18, a feeding device 20, and a cleaning device 60 are arranged. A transport path 47 for transporting paper P, which is an example of a recording medium, is formed in the housing 12.

The image forming portion 14 adopts an electrophotographic method and forms an image on the paper P. The image forming portion 14 has, for example, four image forming units 24. The four image forming units 24 form toner images of colors different from each other, for example, yellow, magenta, cyan, and black.

The image forming units 24 has a photoconductor drum 26. The photoconductor drum 26 is an example of an image holder and rotates while holding a toner image transferred to the paper P on an outer peripheral surface. The image forming unit 24 is provided with a charging device 28 that charges the photoconductor drum 26, an exposure device 29 that forms an electrostatic latent image, a developing device 30 that develops the charged latent image with a toner, and a cleaner device 32 that cleans the photoconductor drum 26 after transfer.

The transfer device 16 has the intermediate transfer belt 22 which is an example of an endless belt. A toner image is primarily transferred from each photoconductor drum 26 to the intermediate transfer belt 22 by a primary transfer roller 36. The primarily transferred toner image is secondarily transferred to the paper P by a secondary transfer roller 38.

The intermediate transfer belt 22 is configured to be hung around a drive roller 40 that is rotationally driven, a driven roller 65 that is driven and rotated by the movement of the intermediate transfer belt 22, and the primary transfer roller 36 and to be movable in the circumferential direction D. An outer peripheral surface of the drive roller 40 is formed by solid rubber 42 which is an example of an elastic body. The outer peripheral surface of the drive roller 40 is covered with the solid rubber 42. The thickness of the solid rubber 42 can be made, for example, 0.5 to 2.0 mm.

The fixing device 18 fixes a toner image transferred to the paper P to, for example, the paper P using heat and pressure.

The feeding device 20 has a storage unit 45 that stores the paper P in a stacked state and a pickup roller 46 that feeds the paper P stored in the storage unit 45 toward the transport path 47. In the transport path 47, the paper P is discharged to a discharge portion 48 outside the housing 12 via a secondary transfer position between the secondary transfer roller 38 and the drive roller 40 and a fixing position generated by the fixing device 18.

Operation of Image Forming Apparatus

In the image forming apparatus 10 configured as described above, a toner image formed on the outer peripheral surface of each photoconductor drum 26 is primarily transferred to the intermediate transfer belt 22, the toner image primarily transferred to the intermediate transfer belt 22 is secondarily transferred to the paper P, and the toner image secondarily transferred to the paper P is fixed to the paper P by the fixing device 18. The paper P in a stacked state in the feeding device 20 is fed by the pickup roller 46, is transported to a space between the secondary transfer roller 38 and the drive roller 40 through the transport path 47, is further transported to the fixing device 18, and is discharged to the discharge portion 48.

A foreign substance 70 (see FIG. 3) adhered to a surface of the intermediate transfer belt 22 on which secondary transfer to the paper P is finished is cleaned away by the cleaning device 60.

Configuration of Cleaning Device

Figure 2:
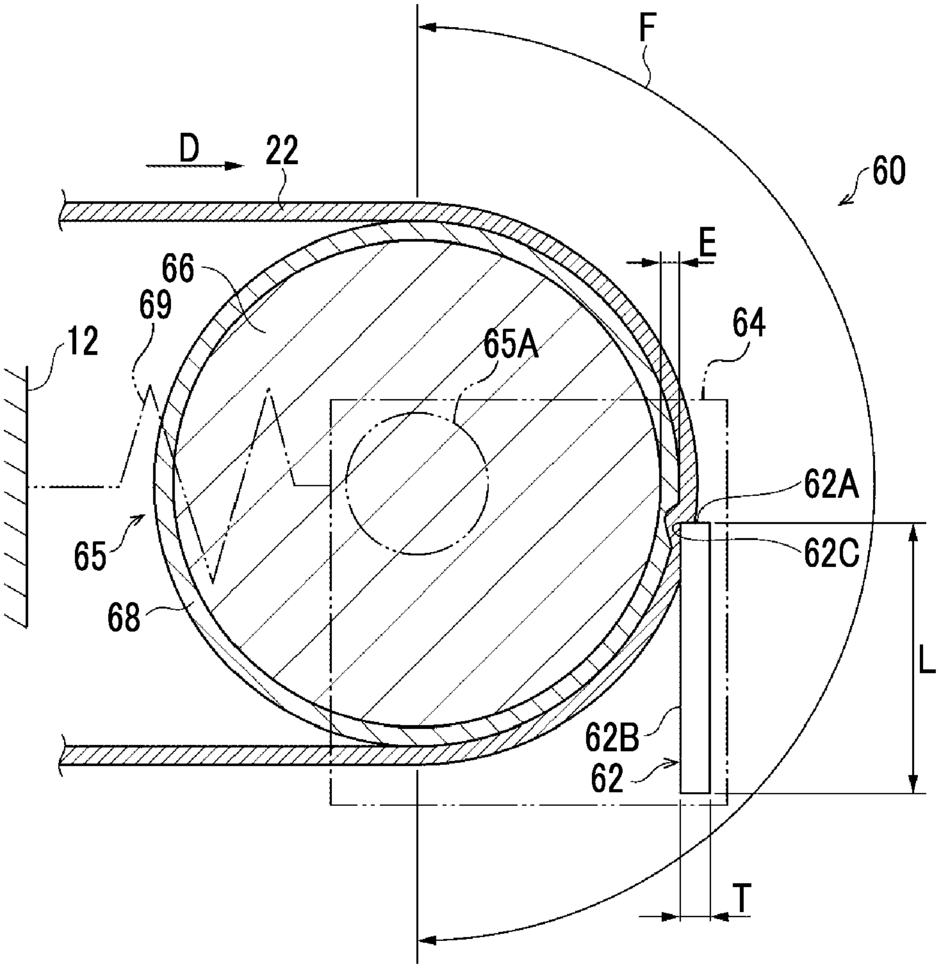
FIG. 2 is a cross-sectional view showing a cleaning device according to the first exemplary embodiment.

As shown in FIG. 2, the cleaning device 60 includes a cleaning member 62 and the driven roller 65.

Cleaning Member 62

The cleaning member 62 is formed by solid rubber which is an example of the elastic body. The hardness (JIS-A) of the cleaning member 62 can be 50 or higher and lower than 90. The cleaning member 62 is formed in a long strip shape extending in the axial direction W of the driven roller 65. The cleaning member 62 is formed to have a rectangular cross-sectional shape orthogonal to the axial direction W having a thickness T (for example, 2 mm) and a width L (for example, 10 mm).

The cleaning member 62 is formed in a blade shape. In the cleaning member 62, a protruding corner 62C is formed by a first surface 62A and a second surface 62B. The cleaning member 62 is arranged with the protruding corner 62C, which is a tip, pressed against the intermediate transfer belt 22 in a range F where the intermediate transfer belt 22 is in contact with the driven roller 65.

Driven Roller 65

The driven roller 65 is arranged to face the protruding corner 62C of the cleaning member 62 via the intermediate transfer belt 22. The driven roller 65 is configured to rotate following the movement of the intermediate transfer belt 22.

The driven roller 65 is configured by a cylindrical core material 66 and a covering body 68 that covers an outer peripheral surface of the core material 66. The core material 66 is formed by a material harder than the covering body 68, for example, a metal and a hard resin.

The covering body 68 is solid rubber which is an example of the elastic body. The solid rubber is formed by a material that hardens at a low temperature, for example, ethylene propylene rubber (EPDM) and acrylonitrile butadiene rubber (NBR). A thickness E of the covering body 68 can be 0.5 mm or more and less than 5.0 mm, and the hardness (JIS-A) of the covering body 68 can be 30 or higher and lower than 90. That is, an outer peripheral surface of the driven roller 65 is formed by solid rubber which is an example of the elastic body.

A bearing 65A of the driven roller 65 and an end portion of the cleaning member 62 in the axial direction W are fixed to a bracket 64. The driven roller 65 and the cleaning member 62 are connected to each other by the bracket 64. The bracket 64 is configured to be movable relative to the housing 12. A spring 69 which is an example of biasing means is connected to the bracket 64. The spring 69 is connected to a frame supported by the housing 12.

The driven roller 65 has a function of a tension roller that applies tension to the intermediate transfer belt 22 with a biasing force of the spring 69. In a case where the driven roller 65 applies and releases tension to the intermediate transfer belt 22 and in a case of a posture change of the intermediate transfer belt 22 when switching between four colors and monochrome, the cleaning member 62 moves together with the driven roller 65. In other words, a relative position between the cleaning member 62 and the driven roller 65 is maintained.

Operation of Cleaning Device

Case of Stopping Intermediate Transfer Belt

Figure 3:
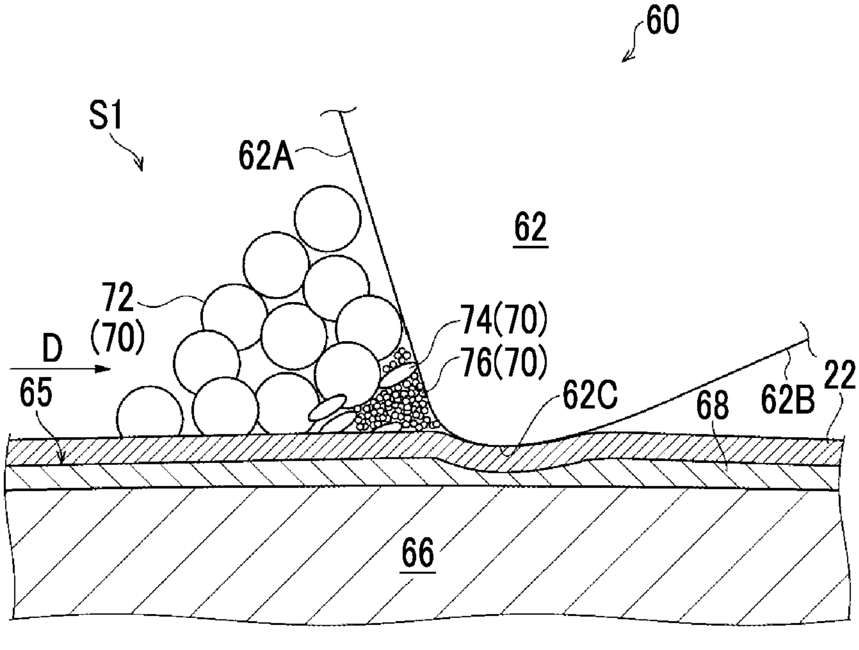
FIG. 3 is an enlarged cross-sectional view showing a part of the cleaning device according to the first exemplary embodiment and shows a state where an intermediate transfer belt is stopped.

At a low temperature, the cleaning member 62 hardens compared to a case of a room temperature. As shown in FIG. 3, at a low temperature, in a stopped state S1 where the intermediate transfer belt 22 is stopped, the protruding corner 62C, which is a tip of the hardened cleaning member 62, is pressed against the intermediate transfer belt 22 and is crushed. In addition, the covering body 68 of the driven roller 65 is crushed as the tip of the cleaning member 62 is pressed against the covering body.

In other words, at a low temperature, in the stopped state S1 where the intermediate transfer belt 22 is stopped, the protruding corner 62C, which is the tip of the cleaning member 62, bites into the outer peripheral surface of the driven roller 65 via the intermediate transfer belt 22.

Case of Operating Intermediate Transfer Belt

Figure 4:
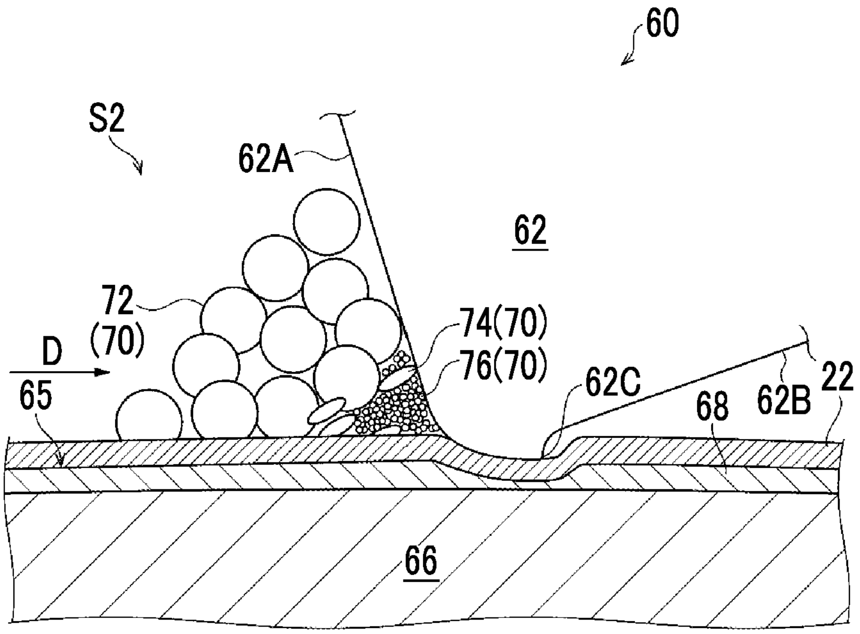
FIG. 4 is an enlarged cross-sectional view showing a part of the cleaning device according to the first exemplary embodiment and shows a state where the intermediate transfer belt is operated.

As shown in FIG. 4, at a low temperature, in a moving state S2 where the intermediate transfer belt 22 moves in the circumferential direction D, the protruding corner 62C, which is the tip of the hardened cleaning member 62, is in a posture of facing a downstream side in the circumferential direction D of the intermediate transfer belt 22 in a state of biting into the outer peripheral surface of the driven roller 65 via the intermediate transfer belt 22. Thus, the first surface 62A on the periphery of the protruding corner 62C is in contact therewith in an inclined state with respect to the circumferential direction D of the intermediate transfer belt 22. Accordingly, the cleaning member 62 cleans away the foreign substance 70 adhered to the intermediate transfer belt 22. Even at a room temperature, in the moving state S2 where the intermediate transfer belt 22 moves in the circumferential direction D, the protruding posture of facing the downstream side in the circumferential direction D of the intermediate transfer belt 22. Examples of the foreign substance 70 include a toner 72, calcium carbonate 74, and silica 76.

Operation of First Exemplary Embodiment

The cleaning device 60 of the first exemplary embodiment includes the blade-shaped cleaning member 62 that has the tip formed by the elastic body, is arranged to be pressed against the intermediate transfer belt 22, and cleans the surface of the intermediate transfer belt 22 and the driven roller 65 that is arranged to face the cleaning member 62 via the intermediate transfer belt 22 and is driven and rotated with the movement of the intermediate transfer belt 22, the driven roller 65 having the outer peripheral surface formed by the elastic body (see FIG. 3).

Figure 5:
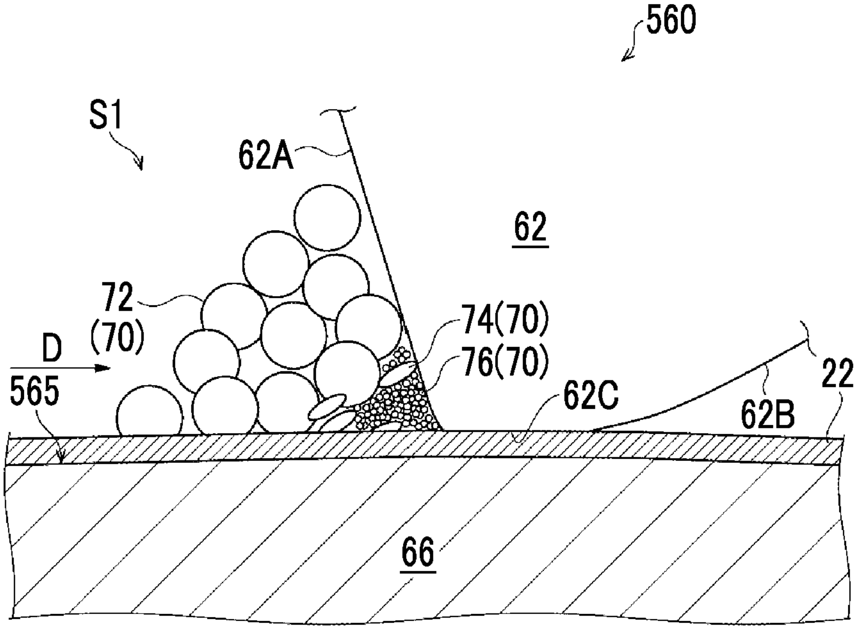
FIG. 5 is an enlarged cross-sectional view showing a part of the cleaning device according to a comparative example and shows a state where the intermediate transfer belt is stopped.

As shown in FIG. 5, in a case where an outer peripheral surface of a driven roller 565 is formed by a metal, at a low temperature, the driven roller 565 is not crushed in the stopped state S1 where the intermediate transfer belt 22 is stopped. For this reason, the protruding corner 62C, which is the tip of the hardened cleaning member 62, does not bite into the outer peripheral surface of the driven roller 565 via the intermediate transfer belt 22.

Figure 6:
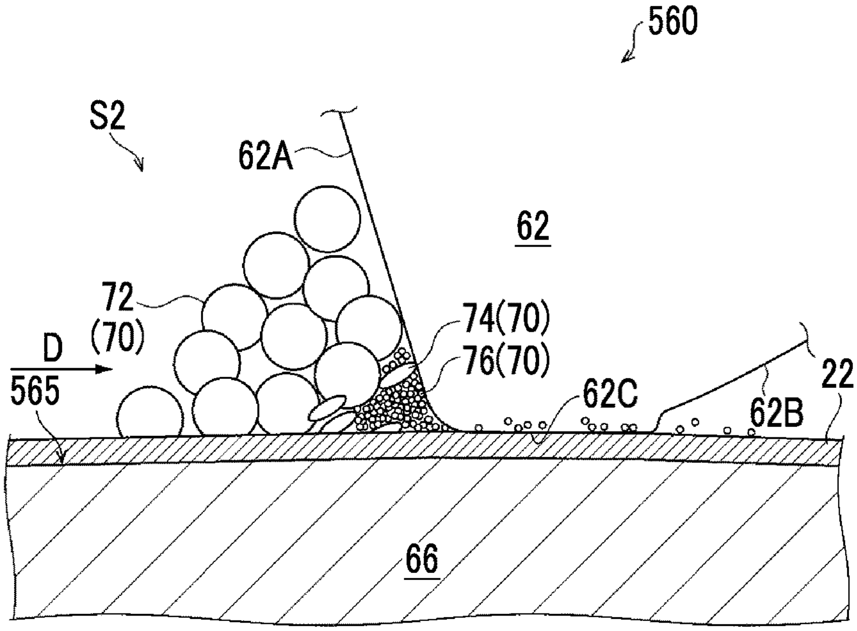
FIG. 6 is an enlarged cross-sectional view showing a part of the cleaning device according to the comparative example and shows a state where the intermediate transfer belt is operated.

In such a state, as shown in FIG. 6, in a case of the moving state S2 where the intermediate transfer belt 22 moves in the circumferential direction D, the protruding corner 62C, which is the tip of the hardened cleaning member 62, relatively moves while being crushed. The first surface 62A on the periphery of the protruding corner 62*C* comes into contact in parallel in the circumferential direction D of the intermediate transfer belt 22 and is not in a target posture, and the foreign substance 70 slips through the cleaning member 62.

In the first exemplary embodiment, as the outer peripheral surface of the driven roller 65 arranged to face the cleaning member 62 via the intermediate transfer belt 22 is formed by solid rubber, the tip of the cleaning member 62 bites into the driven roller 65 via the intermediate transfer belt 22. For this reason, even in a case where the tip of the cleaning member 62 formed by the elastic body is hardened at a low temperature, the tip of the cleaning member 62 bites into the driven roller 65 via the intermediate transfer belt 22, and the tip of the cleaning member 62 is in the target posture.

In a case where the drive roller is used as the facing roller arranged to face the cleaning member 62 via the intermediate transfer belt 22, vibration by caused rotational driving of the drive roller is transmitted to the cleaning member 62 via the intermediate transfer belt 22. For this reason, the tip of the cleaning member 62 moves violently, and the cleaning function may deteriorate.

In the first exemplary embodiment, as a member arranged to face the cleaning member 62 via the intermediate transfer belt 22 is set as the driven roller 65 that is driven and rotated with the movement of the intermediate transfer belt 22, vibration generated in a case where the driven roller 65 rotates is suppressed. For this reason, vibration transmitted from the driven roller 65 to the cleaning member 62 via the intermediate transfer belt 22 is suppressed. As a result, in the cleaning device 60 of the first exemplary embodiment, violent movement of the tip of the cleaning member 62 is suppressed.

In a case where the outer peripheral surface of the driven roller is formed by a metal, when the foreign substance 70 adheres to the driven roller, roughness is formed on the surface of the intermediate transfer belt 22 due to the foreign substance 70 adhered to the driven roller. For this reason, there is a possibility that the cleaning function of the surface of the intermediate transfer belt 22 is impaired.

In the first exemplary embodiment, as the outer peripheral surface of the driven roller 65 is formed by the elastic body, the foreign substance 70 bites into the elastic body of the driven roller 65 in a case where the foreign substance 70 is adhered to the driven roller 65. For this reason, formation of roughness on the surface of the intermediate transfer belt 22 due to the foreign substance 70 adhered to the driven roller 65 is suppressed.

In addition, since the tip of the cleaning member 62 is likely to be deformed by the deformation of the outer peripheral surface of the driven roller 65 as the outer peripheral surface of the driven roller 65 is formed by the elastic body, the hardness of the tip of the cleaning member 62 can be increased compared to a case where the outer peripheral surface of the driven roller 65 is formed by a metal.

In the cleaning device 60 of the first exemplary embodiment, the tip of the cleaning member 62 bites into the outer peripheral surface of the driven roller 65 via the intermediate transfer belt 22 in a state where the intermediate transfer belt 22 is stopped (see FIG. 3).

In a case where the intermediate transfer belt 22 moves as the tip of the cleaning member 62 bites into the outer peripheral surface of the driven roller 65 via the intermediate transfer belt 22 in a state where the intermediate transfer belt 22 is stopped, the tip of the cleaning member 62 is caught in a recess of the intermediate transfer belt 22 formed by biting into the driven roller 65 and is brought into the target posture.

In the cleaning device 60 of the first exemplary embodiment, the hardness of solid rubber which is the elastic body of the driven roller is 30 or higher, and a thickness is less than 5.0 mm.

Since the tip of the cleaning member 62 is pressed against the elastic body of the driven roller 65 via the intermediate transfer belt 22, there is a possibility that the elastic body of the driven roller deforms and is not restored in a case where the elastic body of the driven roller is excessively thick or is excessively soft.

In the first exemplary embodiment, as the hardness of the solid rubber, which is the elastic body of the driven roller, is 30 or higher and the thickness is less than 5.0 mm, the tip of the cleaning member appropriately bites into the endless belt.

In the cleaning device 60 of the first exemplary embodiment, the driven roller 65 is the tension roller that applies tension to the intermediate transfer belt 22.

As the driven roller 65 is the tension roller, a function of applying tension to the intermediate transfer belt 22 is added.

In the cleaning device 60 of the first exemplary embodiment, the relative position between the cleaning member 62 and the driven roller 65 is maintained.

As the relative position between the cleaning member 62 and the driven roller 65 is maintained, a gap between the cleaning member 62 and the driven roller 65 is constant even in a case where the driven roller 65 is moved. For this reason, the tip of the cleaning member 62 maintains a state of being in contact with the intermediate transfer belt 22, and the tip of the cleaning member 62 is in the target posture.

Second Exemplary Embodiment

A cleaning device 160 of a second exemplary embodiment is different from the cleaning device of the first exemplary embodiment in that a configuration of the driven roller is different. Description on portions which are the same or equivalent to content described in the first exemplary embodiment will be made using the identical terms or the identical reference signs.

Configuration of Second Exemplary Embodiment

Figure 7:
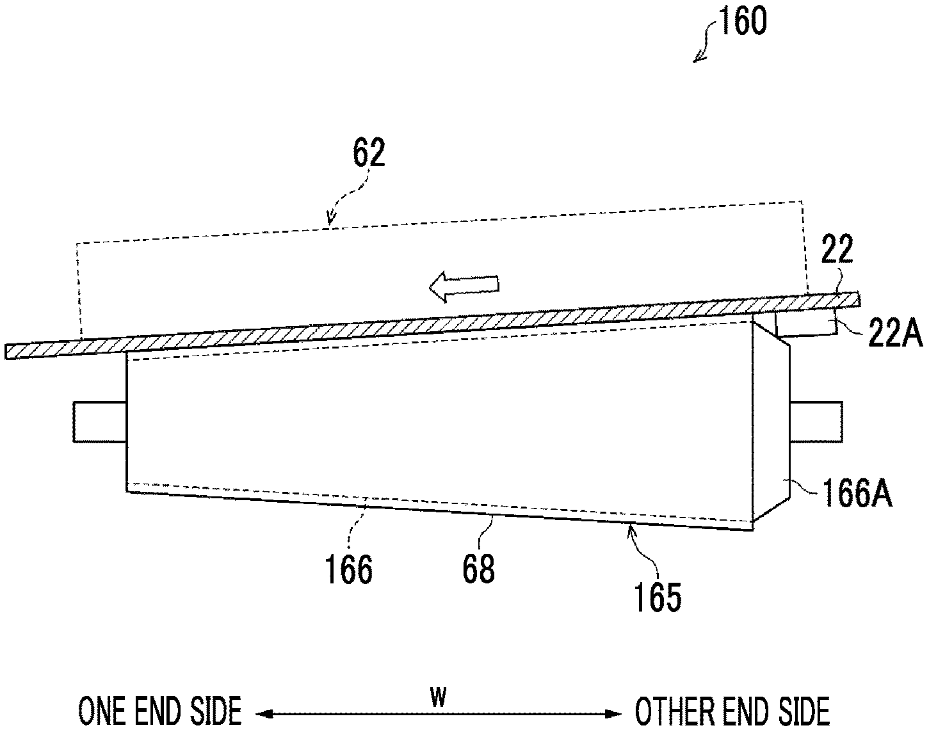
FIG. 7 is a schematic view showing a cleaning device according to a second exemplary embodiment.

As shown in FIG. 7, a driven roller 165 includes a core material 166 and the covering body 68.

The core material 166 is formed in a truncated cone of which a diameter is continuously reduced toward one end side in the axial direction W. In other words, the core material 166 is formed such that an outer diameter decreases toward the one end side in the axial direction W. That is, the driven roller 165 is formed such that the outer diameter decreases toward the one end side in the axial direction W. FIG. 7 shows an exaggerated view, and a difference between a maximum outer diameter and a minimum outer diameter of the driven roller 165 can be, for example, 1.0 mm.

On the other end side of the core material 166 in the axial direction W, a convex portion 166A protruding to the other end side in the axial direction W is formed. On a back surface of the intermediate transfer belt 22 and the other end side in the axial direction W, a protruding portion 22A protruding in a thickness direction is formed. The convex portion 166A and the protruding portion 22A configure a restricting member that restricts the movement of the intermediate transfer belt 22. Similarly, the drive roller 40 may also be formed such that an outer diameter decreases toward one end side in the axial direction and be provided with the restricting member.

In the cleaning device 160 configured as described above, the intermediate transfer belt 22 moves in the circumferential direction D and moves toward the one end side in the axial direction W. In a case where the intermediate transfer belt 22 moves to the one end side in the axial direction W, the protruding portion 22A of the intermediate transfer belt 22 hits the convex portion 166A of the driven roller 165. Accordingly, the movement of the intermediate transfer belt 22 in the axial direction W is restricted, and meandering of the intermediate transfer belt 22 is restricted compared to a case where the driven roller has a cylindrical shape which is not in an inclined state.

Operation of Second Exemplary Embodiment

In the cleaning device 160 of the second exemplary embodiment, the driven roller 165 is formed such that an outer diameter decreases toward the one end side in the axial direction W (see FIG. 7).

For example, in a case where the drive roller and the driven roller around which rubber is wound are inclined in opposite directions to each other, there is a possibility that the intermediate transfer belt 22 is twisted.

In the second exemplary embodiment, as the driven roller 165 is formed such that the outer diameter decreases toward the one end side in the axial direction W, the intermediate transfer belt 22 is moved toward the one end side in the axial direction W. For this reason, a direction in which the intermediate transfer belt 22 moves is restricted.

In addition, since the intermediate transfer belt 22 is moved toward the one end side in the axial direction W in the cleaning device 160 of the second exemplary embodiment, it is not necessary to provide the restricting member that restricts the movement of the intermediate transfer belt 22 on the one end side of the intermediate transfer belt 22 in the axial direction W.

Since other configurations and operational effects are substantially the same as in the first exemplary embodiment, description thereof will be omitted.

Third Exemplary Embodiment

A cleaning device 260 of a third exemplary embodiment is different from the cleaning device of the first exemplary embodiment in that a cleaning member cleaning the driven roller is provided. Description on portions which are identical or equivalent to content described in the first exemplary embodiment will be made using the identical terms or the identical reference signs.

Configuration of Third Exemplary Embodiment

Figure 8:
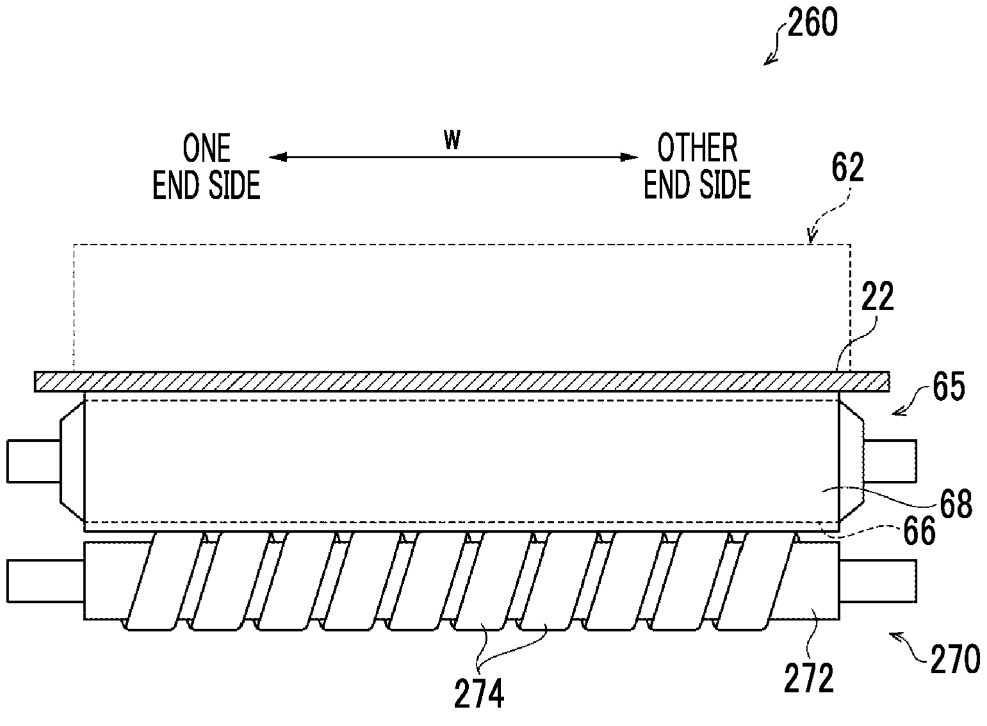
FIG. 8 is a schematic view showing a cleaning device according to a third exemplary embodiment.

As shown in FIG. 8, the cleaning device 260 of the third exemplary embodiment includes a cleaning roller 270 which is an example of the cleaning member. The cleaning roller 270 includes a shaft 272 and an elastic layer 274 that is spirally wound around an outer peripheral surface of the shaft 272.

The elastic layer 274 of the cleaning roller 270 is arranged to be in contact with the covering body 68 of the driven roller 65. The cleaning roller 270 is configured to be driven and rotated by the rotation of the driven roller 65.

The elastic layer 274 is a foam configured by a material having bubbles. The elastic layer 274 is spirally arranged on the outer peripheral surface of the shaft 272 from the one end side to the other end side in the axial direction W.

In the cleaning device 260 configured as described above, in a case the cleaning roller 270 is driven and rotated by the driven roller 65, the foreign substance 70 adhered to an outer peripheral surface the covering body 68 of the driven roller 65 is removed by the cleaning roller 270 that is driven and rotated by the driven roller 65.

Specifically, the foreign substance 70 adhered to the outer peripheral surface of the covering body 68 of the driven roller 65 is wiped off by an outer surface of the elastic layer 274 of the cleaning roller 270 and is removed as being scraped off by an edge portion of the elastic layer 274.

Operation of Third Exemplary Embodiment

The cleaning device 260 of the third exemplary embodiment includes the cleaning roller 270 that is provided to be in contact with the driven roller 65 and that cleans a surface of the driven roller 65 (see FIG. 8).

As the cleaning roller 270 that cleans the surface of the driven roller 65 is included, the foreign substance 70 adhered to the driven roller 65 is cleaned away by the edge portion of the elastic layer 274 of the cleaning roller 270.

Since other configurations and operational effects are substantially the same as in the first exemplary embodiment, description thereof will be omitted.

As described above, although the specific exemplary embodiments of the present invention have been described, the present invention is not limited to the exemplary embodiments, and various modifications, changes, and improvements are possible without departing from the technical spirit of the present invention.

An example in which the driven rollers 65 and 165 are tension rollers applying tension to the intermediate transfer belt 22 is given in the first exemplary embodiment to the third exemplary embodiment. However, the tension roller may be provided separately, and the driven roller may not have a function of the tension roller.

An example in which the covering bodies 68 of the driven rollers 65 and 165 are solid rubber is given in the first exemplary embodiment to the third exemplary embodiment. However, the covering body of the driven roller may be foamed rubber which is an example of the elastic body. In this case, the hardness (JIS-A) of the foamed rubber can be 30 or higher, and the thickness can be less than 5.0 mm. As the hardness of the foamed rubber of the driven roller is 30 or higher and the thickness is less than 5.0 mm, a tip portion of the cleaning member bites deeper into the driven roller via the endless belt.

In the third exemplary embodiment, an example in which the cleaning member is the cleaning roller 270 around which a foam is spirally wound is given. However, the cleaning member is not limited to this form, and for example, may be a member around which a foam is wound to cover the outer periphery of the shaft.

In the first exemplary embodiment to the third exemplary embodiment, an example in which the endless belt is the intermediate transfer belt 22 is given. However, the endless belt is not limited to this form, for example, may be a secondary transfer belt, or may be a transport belt through which the paper P is transported.

In the first exemplary embodiment to the third exemplary embodiment, an example in which the image forming apparatus 10 is an intermediate transfer type including the intermediate transfer belt 22 is given. However, the image forming apparatus may be an apparatus that is a direct transfer type and has the cleaning device cleaning a surface of the transport belt through which the paper P is transported.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning device comprising:

a blade-shaped cleaning member of which a tip formed by an elastic body is arranged to be pressed against an endless belt and that cleans a surface of the endless belt; and a driven roller that is arranged to face the blade-shaped cleaning member via the endless belt and is driven and rotated with movement of the endless belt and of which an outer peripheral surface is formed by an elastic body, wherein the endless belt moves in a circumferential direction, and the blade-shaped cleaning member comprising a protruding corner as the tip, the protruding corner being in a posture of facing a downstream side in the circumferential direction and in a state of biting into the outer peripheral surface of the driven roller via the endless belt, wherein the driven roller is formed such that an outer diameter decreases toward one end side in an axial direction.

2. The cleaning device according to claim 1, wherein the tip of the blade-shaped cleaning member bites into the outer peripheral surface of the driven roller via the endless belt in a state where the endless belt is stopped.

3. The cleaning device according to claim 2, wherein a hardness of solid rubber, which is the elastic body of the driven roller, is 30 or higher, and a thickness of the solid rubber is less than 5.0 mm.

4. The cleaning device according to claim 3, wherein the endless belt is an intermediate transfer belt.

5. The cleaning device according to claim 2, wherein a hardness of foamed rubber, which is the elastic body of the driven roller, is 30 or higher, and a thickness of the foamed rubber is less than 5.0 mm.

6. The cleaning device according to claim 5, wherein the endless belt is an intermediate transfer belt.

7. The cleaning device according to claim 2, wherein the endless belt is an intermediate transfer belt.

8. The cleaning device according to claim 2, wherein the driven roller is a tension roller that applies tension to the endless belt.

9. The cleaning device according to claim 1, wherein a hardness of solid rubber, which is the elastic body of the driven roller, is 30 or higher, and a thickness of the solid rubber is less than 5.0 mm.

10. The cleaning device according to claim 9, wherein the endless belt is an intermediate transfer belt.

11. The cleaning device according to claim 9, wherein the driven roller is a tension roller that applies tension to the endless belt.

12. The cleaning device according to claim 1, wherein a hardness of foamed rubber, which is the elastic body of the driven roller, is 30 or higher, and a thickness of the foamed rubber is less than 5.0 mm.

13. The cleaning device according to claim 12, wherein the endless belt is an intermediate transfer belt.

14. The cleaning device according to claim 1, wherein the endless belt is an intermediate transfer belt.

15. The cleaning device according to claim 1, wherein the driven roller is a tension roller that applies tension to the endless belt.

16. The cleaning device according to claim 15, wherein a relative position between the blade-shaped cleaning member and the tension roller is maintained.

17. The cleaning device according to claim 1, further comprising:

a cleaning member that is provided to be in contact with the driven roller and cleans a surface of the driven roller.

18. The cleaning device according to claim 17, wherein the cleaning member is a cleaning roller around which a foam is spirally wound.

19. An image forming apparatus comprising:

the cleaning device according to claim 1; and a drive roller that drives the endless belt and of which an outer peripheral surface is formed by an elastic body.

* * * * *